June 6, 1944. W. G. CHARLEY 2,350,588
AGRICULTURAL MACHINE
Original Filed Aug. 15, 1941 4 Sheets-Sheet 1

June 6, 1944.   W. G. CHARLEY   2,350,588
AGRICULTURAL MACHINE
Original Filed Aug. 15, 1941   4 Sheets-Sheet 3

Inventor
W. G. Charley
by
W. Ziebold
Attorney

June 6, 1944.　　　W. G. CHARLEY　　　2,350,588
AGRICULTURAL MACHINE
Original Filed Aug. 15, 1941　　4 Sheets-Sheet 4

Inventor
W. G. Charley.
by W. Gierold
Attorney

Patented June 6, 1944

2,350,588

UNITED STATES PATENT OFFICE 2,350,588

AGRICULTURAL MACHINE

Walter G. Charley, La Crescent, Minn., assignor to Allis-Chalmers Manufacturing Company, Milwaukee, Wis., a corporation of Delaware Original application August 15, 1941, Serial No. 407,031. Divided and this application January 18, 1943, Serial No. 472,671

20 Claims. (Cl. 97—50)

The invention relates to agricultural machines, and it is concerned more specifically with an improved implement adjusting mechanism adapted for use on cultivators and on machines of a similar character. The present application is a division of application, Serial No. 407,031, filed on August 15, 1941 for Agricultural implement.

In cultivators and like machines which have a ground working implement it is usual to provide for adjustment of the implement so that it may be lowered into a working position and raised from the working to a non-working position. When the implement is adjusted to its working position the draft force and the soil reaction to which it is subjected in operation may tend to force the implement out of the ground under certain conditions; for instance, in a cultivator the shovels usually have at tendency to jump out of the ground when they run into a hard spot or into a local rise of the ground; and suitable provisions must be made for holding the implement in its working position under those conditions. If the implement is relatively heavy its weight may be sufficient to hold it in the ground, but in many instances, as in cultivators, the strength requirements are not such as to call for a relatively heavy construction which would afford sufficient weight to hold the implement in the ground. In that case the adjusting mechanism for the implement may be constructed so as to prevent or restrain the implement from being forced out of the ground under all normal and under certain abnormal conditions of operation of the machine, and it is the principal object of the invention to provide an improved implement adjusting mechanism which will accomplish that result.

More specifically, it is an object of the invention to provide an implement adjusting mechanism of the mentioned character which is operable in implement raising direction by a suitable actuating device; which is self-actuating in implement lowering direction; and which requires no substantial holding power by the actuating device in order to restrain or prevent the implement from being forced out of the ground by the draft force and soil reaction to which the implement is subjected in operation of the machine.

A further object of the invention is to provide an agricultural machine having an implement adjusting mechanism and actuating device therefor as outlined above, in which the actuating device is operable between predetermined limits in one direction to raise the implement from a working to a non-working position, and in the opposite direction by gravitational movement of the implement from its non-working position, the potential energy of the raised implement being suitably controlled to hold the implement in its raised position for any desired length of time.

A further object of the invention is to provide an implement adjusting mechanism as outlined hereinbefore and incorporating a device for changing the depth of soil penetration of the implement.

A still further object of the invention is to provide an improved depth changing device affording what is known as a "constant height lift," and to incorporate such improved constant height lift device in an implement adjusting mechanism having the specific features outlined hereinbefore.

Another object of the invention is to provide a tractor mounted implement having front and rear tools, in which the front and rear tools are interconnected for raising movement by a single actuating mechanism, and in which the rear tools, in their lowered position, are not liable to be raised out of the ground if one or more of the front tools, while adjusted to a lowered or ground engaging position, should temporarily tend to ride to a higher level, as may occur during advance of the machine.

A further object of the invention is to provide an improved implement adjusting mechanism incorporating the features outlined hereinbefore and which may be equipped with a balancing spring, or with a plurality of such springs, in order to facilitate its operation.

A still further object of the invention is to provide an improved implement adjusting mechanism incorporating the features outlined hereinbefore in a relatively simple and compact structure, which will be efficient in operation and which may be manufactured at relatively low costs.

With the foregoing objects in view the invention contemplates an implement adjusting mechanism incorporating a link and lever system for transmitting movement from an actuating element to an implement, and in which the link and lever system is so arranged that when the implement is in its working position the link and lever system occupies a toggle position in sufficiently close proximity to a dead center position thereof to afford a relatively high initial resistance against any reactive force tending to move the implement from its working to its non-working position, and a relatively low resistance against a positive force exerted upon the link and lever system by the actuating element and tending to move the link and lever system out of said toggle position in a direction away from said dead center position in order to move the implement from its working to its non-working position.

The link and lever system as contemplated by the invention has a suitable connection with the traveling support on which the implement is adjustably mounted, so that, when the implement is in its working position and the link and lever system is in its mentioned toggle position, at least a major part of any reactive force which tends to move the implement from its working towards its non-working position will be taken up by the traveling support independently of the actuating element which may have a permanent operating connection with the link and lever system. As a result, the actuating element will not be required to exert any substantial holding power, while the implement is in its working position, in order to restrain or prevent the implement from moving from its working towards its non-working position, and this constitutes one of the major features of the invention.

In order to raise and lower the implement, as in a cultivator, a swingable arm suitably connected with the implement and to be referred to as a "lifting arm" may be mounted on the traveling support, and the actuating element for moving the lifting arm from an implement lowered to an implement raised position may be permanently connected to a "rock arm" which is likewise swingably mounted on the traveling support and which forms an element of the link and lever system. The invention contemplates an arrangement of the link and lever system which will be such that when the rock arm has been moved from a predetermined starting position by operation of the actuating element, it may be returned to said starting position by gravitational movement of the implement from its raised to its lowered position, and as a result the actuating element will also be returned to its starting position by said gravitational movement of the implement. The link and lever system is moreover contemplated to be arranged in such a manner that when the lifting and rock arms are in their implement lowered and starting positions, respectively, the link and lever system will occupy its mentioned toggle position affording a relatively high initial resistance against movement of the link and lever system under a reactive force exerted by the implement upon the lifting arm, and a relatively low resistance against movement of the link and lever system by operation of the actuating element. When the rock arm, in the mentioned arrangement of the link and lever system, occupies its starting position a reactive force of the implement will be taken up at least to a major extent by the traveling support so that the rock arm will not be subjected to any substantial force which would tend to move it in implement raising direction, and it will therefore not be necessary to lock the actuating element after it has been returned to its starting position by the mentioned gravitational movement of the implement.

An implement adjusting mechanism incorporating a link and lever system as outlined above, affords several advantages from a practical standpoint. For instance, if it is desired to use a hydraulically operated device to furnish the lifting power for the implement, such device may simply consist of a single acting hydraulic jack comprising a cylinder and a piston movable therein by admission of fluid pressure into the cylinder at one side of the piston, one of the relatively movable elements of the hydraulic jack, for instance the cylinder, being mounted on the traveling support, and the other being permanently connected with the rock arm. After the implement has been raised by admission of fluid pressure into the cylinder it may be held in its raised position by suitable control of the operating fluid, and when it is desired to lower the implement all that is necessary is to release the fluid pressure whereupon the implement will move under its own weight to its working position and simultaneously return the piston to its starting position within the cylinder. While the piston is in its starting position the hydraulic jack is substantially ineffective to oppose movement of the rock arm in implement raising direction, but the implement will nevertheless be considerably restrained or prevented from coming out of the ground due to the mentioned arrangement of the link and lever system.

In the case of a machine having front and rear mounted implements, such as a tractor cultivator, the front tools may be connected with the lifting arm, and the rear tools may be connected with the rock arm, so that the front and rear tools will be raised by movement of the rock arm in implement raising direction. The mentioned arrangement of the link and lever system will then be effective to restrain or prevent the front tools from coming out of the ground without exerting a substantial lifting force upon the rear tools.

The foregoing and other objects and advantages of the invention will be more fully apparent from the following description of a preferred embodiment of the invention shown in the accompanying drawings. Referring to the drawings in which like reference characters designate the same or similar parts in the various views:

Fig. 5 is an enlarged section on line V—V of Fig. 1;

Figure 1:
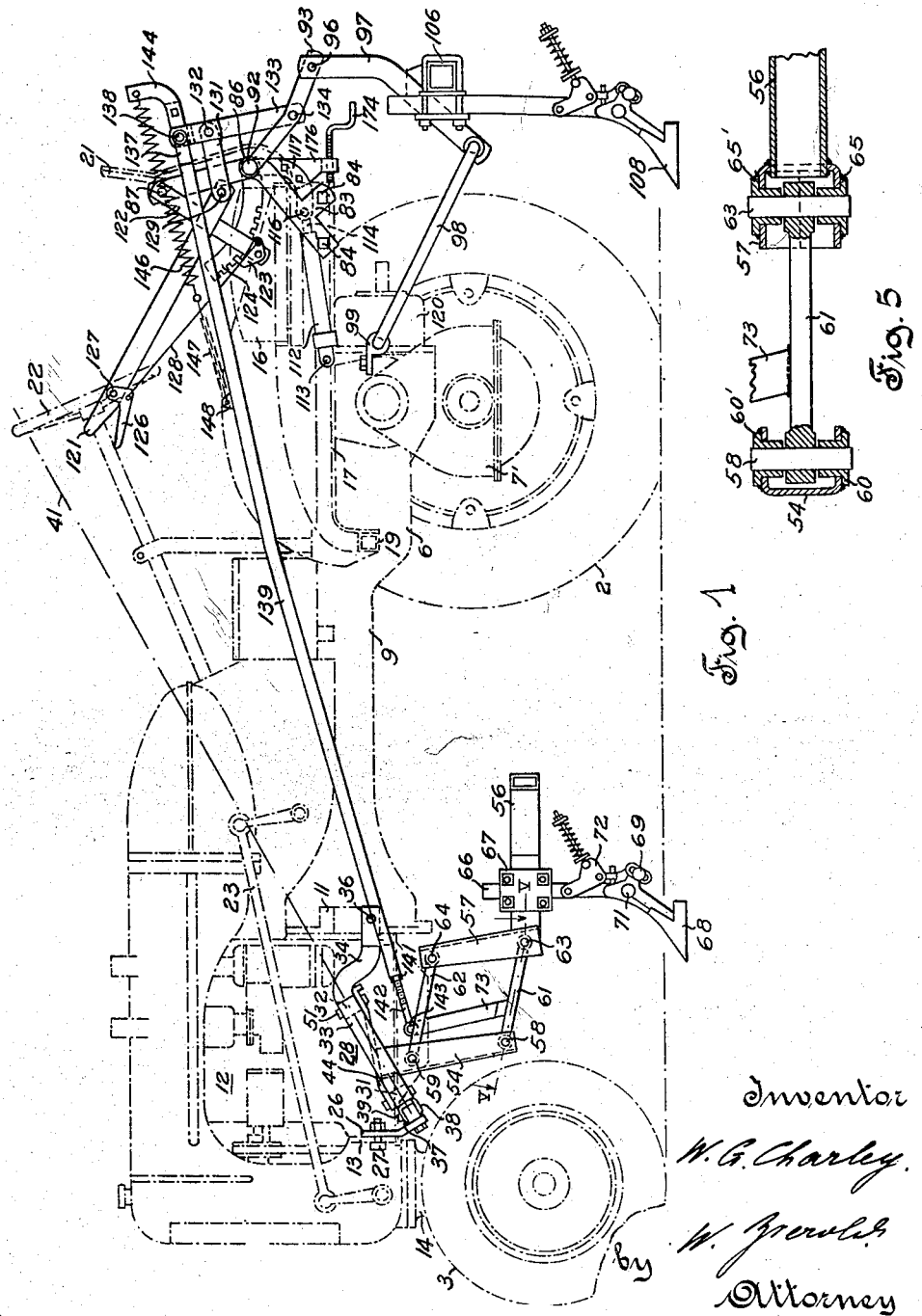
Fig. 1 is a side view of a tractor and cultivator mounted thereon, showing the cultivator adjusted to an operative position, the near rear wheel of the tractor being omitted to expose rear connections of the cultivator with the tractor.
Figures 6, 7:
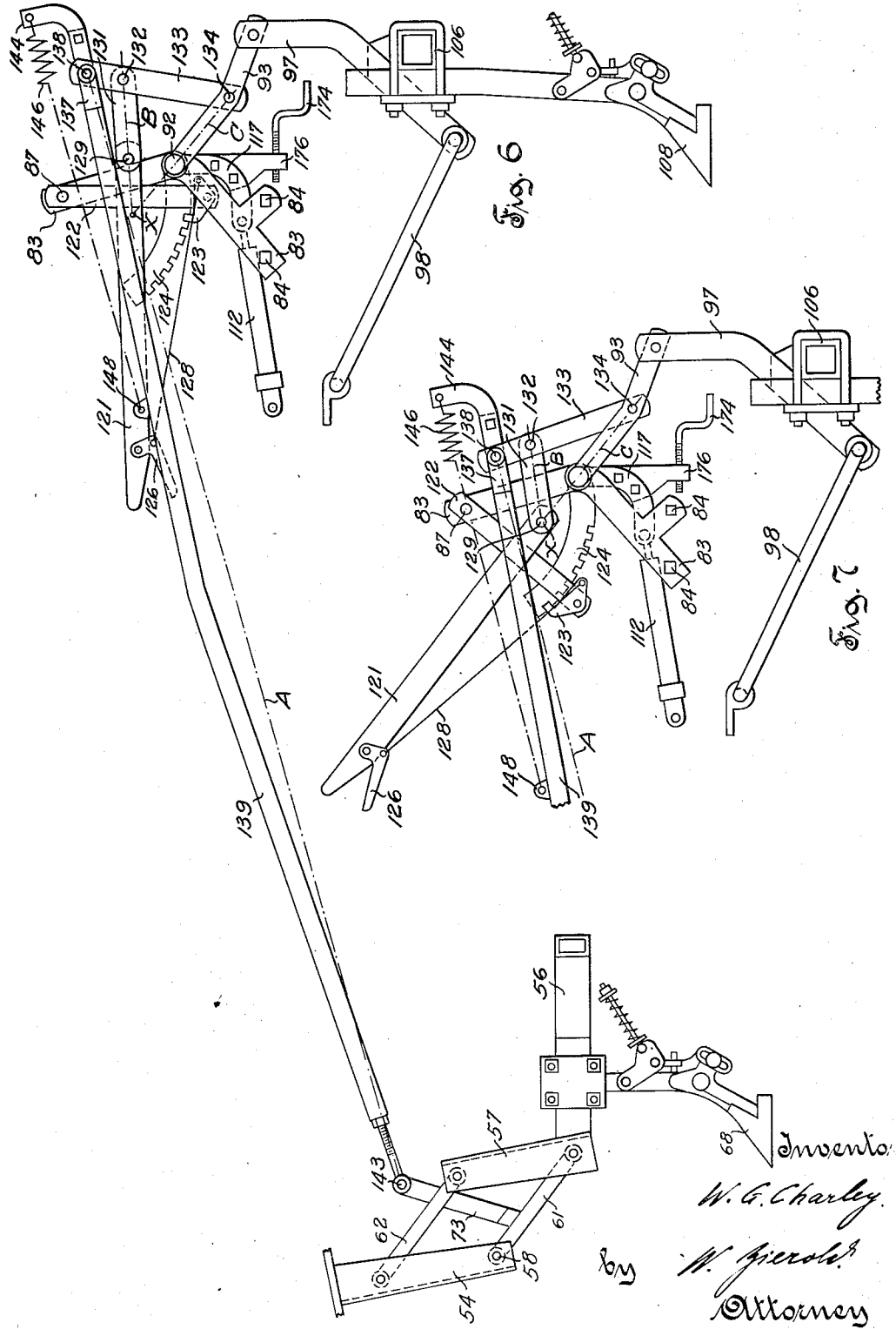

Fig. 6 is an enlarged view of the adjusting mechanism for the front and rear implement units shown in Fig. 1, the rear unit being shown in the same position as in Fig. 1, and the front unit being shown adjusted to a position of deepest soil penetration; and Fig. 7 is a partial view of the mechanism shown in Fig. 6, illustrating a different position of the mechanism to which it may be adjusted in order to decrease the depth of soil penetration of the front unit.

The tractor shown in the drawings is a tricycle type tractor having widely spaced rear wheels 1 and 2 and a pair of closely spaced front wheels 3 and 4 centrally ahead of the rear wheels 1 and 2. An upwardly arched rear axle structure on which the rear wheels are mounted comprises a central gear casing 6 and side arms 7 and 8 having outer housing portions 7' and 8' depending at the outer ends of the side arms and enclosing final drive gears for the rear wheels 1 and 2. Secured to the gear casing 6 at the forward side of the rear axle structure is a torque tube casing 9 which has an elongated relatively narrow portion extending longitudinally of the tractor and terminating at the forward end of the torque tube casing in a rearwardly tapering bell housing having mounting pads 11 at opposite sides of the tractor. An internal combustion engine 12 is rigidly secured to the torque tube casing 9, at the forward end of the bell housing, and a bracket 13 secured to the forward end of the engine 12 is supportingly connected with a pedestal 14 on which the front wheels 3 and 4 are mounted. An operator's seat at the rear of the tractor comprises a seat cushion 16 supported by longitudinal frame bars 17 and 18 secured intermediate their ends to the side arms 7 and 8 of the rear axle structure and connected together at their forward ends by a cross-bar 19 mounted on and extending transversely of the torque tube casing 9. The operator's seat also includes a backrest 21 which is supported on the support for the seat cushion at a suitable distance above the seat cushion. A steering wheel 22 within reach of an operator seated on the cushion 16 is operatively connected with the front wheels 3 and 4 by a steering mechanism including a reach rod 23 at the left side of the tractor.

Figure 2:
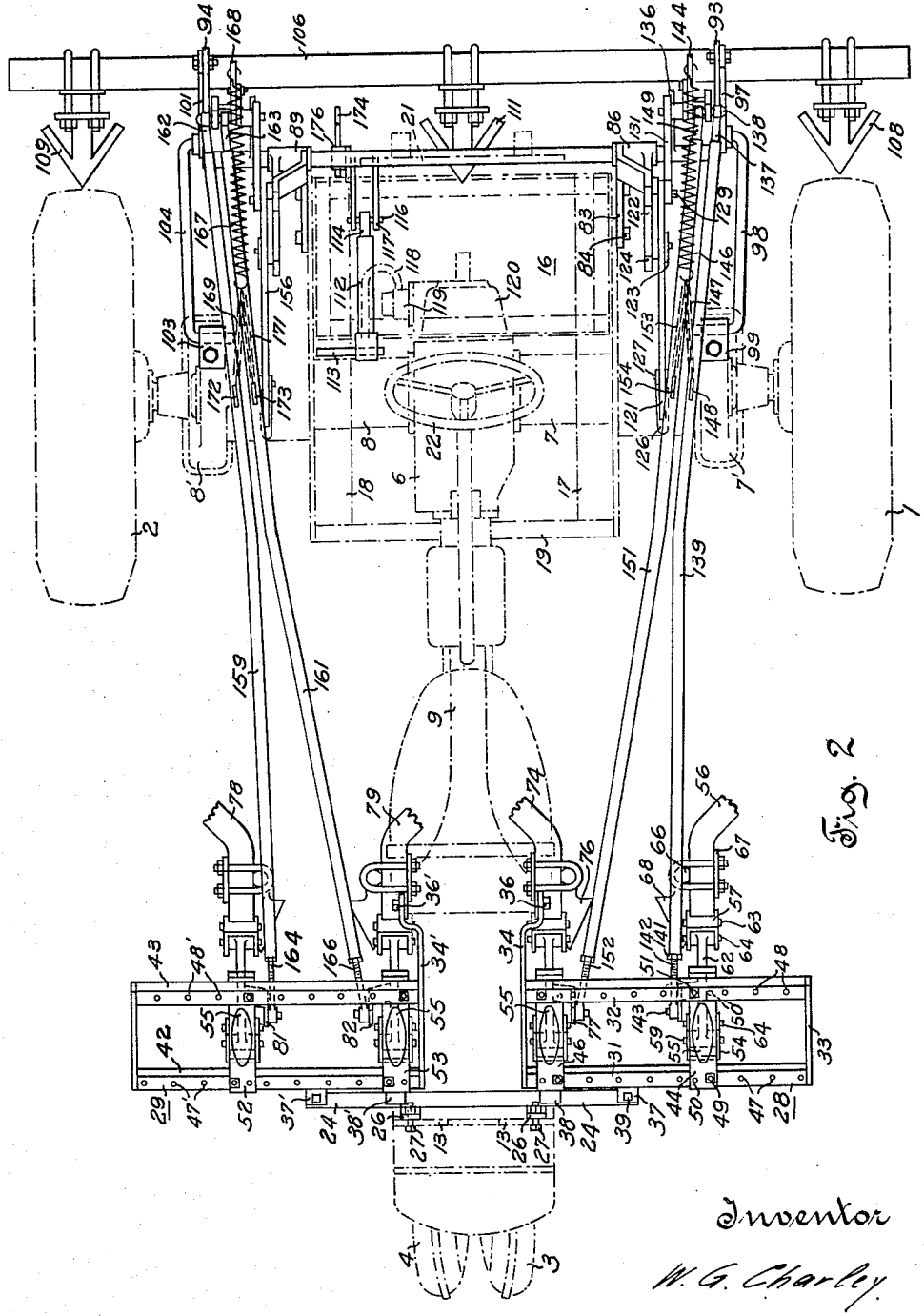
Fig. 2 is a top view of the machine shown in Fig. 1.

Referring to Fig. 2, a square cross-bar 24 extends transversely of the tractor below the engine 12 and is rigidly secured to the bracket 13 by a pair of hangers 26, the hangers being detachably secured to the bracket 13 by bolts 27. The cross-bar 24 serves as a forward support for a pair of draft frames 28 and 29 at opposite sides of the tractor. The draft frame 28 comprises a pair of square tubular draft bars 31 and 32 which are rigidly connected at their outer ends by a plate member 33 and at their inner ends by a strap 34 which has a bent rearward extension bolted to the mounting pad 11 at the left side of the tractor at 36. Secured to the forward draft bar 28 is an angle clip 37 and a U-clip 38, the angle clip 37 having an upper leg overlying the cross-bar 24, and a bolt 39 extends through the upper leg of the clip 37 and is screwed into a tapped hole at the outer end of the cross-bar 24 to rigidly secure the clip 37 to the cross-bar 24. The U-clip 38 is open at its forward end, and its legs are spaced to provide a close fit on the cross-bar 24 at the top and bottom sides of the latter.

Referring to Fig. 1, it will be noted that the draft bar 32 is arranged rearwardly of and above the draft bar 31 and that the seating surface of the cushion 16 of the operator's seat is arranged below a plane, indicated at 41, through the axes of the draft bars 31 and 32.

The draft frame 29 at the right side of the tractor is constructed and arranged in the same manner as has just been described in connection with the draft frame 28, that is, the draft frame 29 comprises a pair of square tubular draft bars 42, 43, as shown in Fig. 2, which extend transversely of the tractor and are offset relative to each other so that their axes will coincide with the plane 41. An angle clip 37' corresponding to the angle clip 37, and a U-clip 38', corresponding to the U-clip 38, connect the draft frame 29 to the cross-bar 24 at the right side of the tractor, and a strap 34', corresponding to the strap 34, is bolted to the mounting pad 11 at the right side of the tractor at 36'.

A pair of plate members 44 and 46 are secured to the draft frame 28 for adjustment transversely of the tractor, a series of holes 47 and 48 being provided in the draft bars 31 and 32, and the plate members 44 and 46 having holes 50 and 50' for the reception of bolts 49 and 51. A similar pair of plate members 52 and 53 are adjustably mounted on the draft frame 29, the draft bars 42 and 43 having longitudinal series of holes 47' and 48', respectively.

A channel shaped bracket 54, see Figs. 1 and 5, is secured in a depending position to an oblong elevated portion 55 (Fig. 2) of the plate member 44, and a similar depending bracket is secured to each of the plate members 46, 52 and 53. The depending brackets serve to transmit draft to individual forward implement units, which are arranged in pairs at opposite sides of the tractor. The outer implement unit at the left side of the tractor comprises a rig beam 56, an upstanding channel shaped bracket 57, and a cultivator shovel, or a plurality of such shovels, mounted on the rig beam as more fully explained hereinbelow. A pin 58 is journaled in bushings 60 and 60' (Fig. 5) at the lower end of the depending bracket 54, and carries a lower draft link 61 which is press fitted at its forward end upon the pin 58 between the bushings 60, 60'. An upper draft link 62 is similarly press fitted at its forward end upon a pin 59 which is journaled in bushings similar to the bushings 60, 60' at an upper portion of the depending bracket 54. The rear end of the lower draft link 61 is press fitted upon a pin 63, and the rear end of the upper draft link 62 is press fitted upon a pin 64, the pins 63 and 64 being journaled on the upstanding bracket 57 of the implement unit in rear of the bracket 54. Referring to Fig. 5, the pin 63 is journaled in bushings 65, 65' at the lower end of the upstanding bracket 57, and similar bushings are provided at the upper end of the bracket 57 to mount the pin 64. The implement unit comprising the rig beam 56 is thus mounted for up and down movement relative to the traveling support represented by the tractor.

A tool shank 66 is secured to the rig beam 56 by a clamping device 67 permitting vertical adjustment of the tool shank 66 on the rig beam 56, and a cultivating shovel 68 is mounted on the lower end of the tool shank 66 in the usual manner by an adjustable connection 69 permitting pivotal adjustment of the cultivating shovel about a pivot center 71 to vary the suction of the cultivating shovel 68. The shovel 68 is releasably held in its operative position on the tool shank 66 by a spring trip mechanism 72 of conventional construction.

Figure 4:
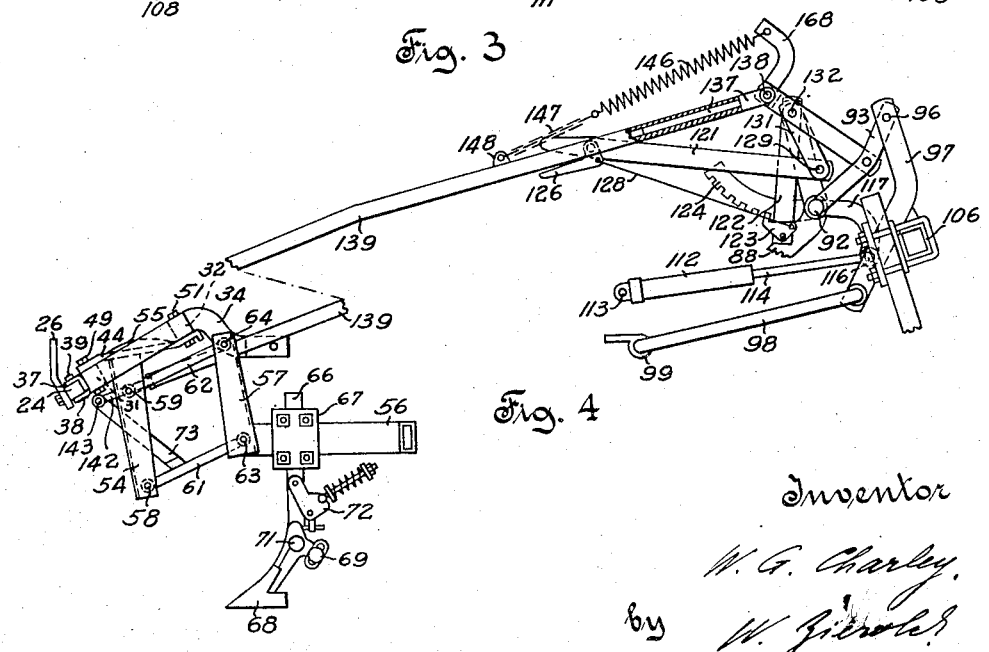
Fig. 4 is a schematic view showing the front frame of the cultivator and associated parts at a reduced horizontal spacing from the rear part of the cultivator, but at the same vertical spacing from said rear part as in Fig. 2, the schematic view illustrating the cultivator in the inoperative position to which it may be adjusted on the tractor.

Secured to the lower link 61 between the brackets 54 and 57 is an arm 73 which extends upwardly from the lower link and is offset towards the tractor to permit movement of the arm past the bracket 54 in a forward direction about the pivot center 58. The arm terminates at its upper end below the draft frame 28 at such a distance therefrom that it may clear the forward draft bar 31 when swung forwardly as shown in Fig. 4. The arm 73 constitutes a lifting arm for the implement unit comprising the rig beam 56, and it is movable about the pivot center at 58, which is fixed on the traveling support, from an implement lowered position as shown in Fig. 1 to an implement raised position as shown in Fig. 4, and vice versa, in a generally fore and aft direction.

Referring to Fig. 2, the rig beam 56 has a forward portion extending longitudinally of the tractor and a rearward portion at an angle relative to the forward portion, extending rearwardly and away from the tractor, the rearward portion affording a section for mounting another cultivating shovel (not shown) in laterally offset relation to the cultivating shovel 68. Another implement unit comprising a rig beam 74 is connected with the depending bracket of the plate member 46 by means of a pair of lower and upper draft links in the same manner as has been described hereinbefore in connection with the implement unit comprising the rig beam 56. The rig beam 74 is similar to the rig beam 56, but angled in the opposite direction so that the rear portion of the rig beam 74 extends rearwardly towards the tractor. A cultivating shovel 76 is mounted on the forward portion of the rig beam 74 in the same manner as the cultivating shovel 68 is mounted on the rig beam 56, and the implement unit comprising the shovel 76 may be raised and lowered in the same manner as the implement unit comprising the shovel 68, that is, by means of a lifting arm 77 (Fig. 2) secured to the lower one of the draft links which are pivoted on the depending bracket of the plate member 46.

The spacing between the plate members 44, 46 on the draft frame 28 is such as to permit the shovels 68 and 76 to travel at opposite sides of a plant row extending longitudinally of the tractor, and the shovels 68 and 76 may conveniently be adjusted to work closer to or farther away from such plant row by the described adjustment of the plate members 44, 46 on the draft frame 28.

Another pair of rig beams 78, 79 corresponding to the rig beams 56 and 74 are arranged at the other side of the tractor and connected with the depending brackets of the plate members 52 and 53, respectively, in the same manner as has been described hereinbefore in connection with the mounting of the rig beams 56 and 74 on the draft frame 28. That is, the rig beams 78, 79 may be raised and lowered by fore and aft movement of lifting arms 81, 82 about lower pivot centers on the brackets depending from the plate members 52 and 53.

Referring to the rear part of the cultivator, which is mounted at the rear of the tractor, a stationary bracket 83 is secured to the left frame bar 17 by a pair of bolts 84, the bracket having a bearing boss 86 (Fig. 3) and extending upwardly beyond the bearing boss 86 to provide a pivot center at 87. Another stationary bracket 88, corresponding to the bracket 83, is secured to the frame bar 18 at the right side of the tractor and has a bearing boss 89 in alinement with the bearing boss 86 of the bracket 83. The bracket 88 extends upwardly beyond the bearing boss 89 to provide a pivot center at 91 (Fig. 3) corresponding to the pivot center 87 on the bracket 83. Rotatably mounted in the bearing bosses 86, 89 is a cross shaft 92 which has a rock arm 93 on its outer end at the left side of the tractor and a rock arm 94 at the right side of the tractor. Pivoted on the outer end of the rock arm 93 at 96 (Fig. 1) is a bent strap 97 and a link 98 extends between the lower end of the strap 97 and a bracket 99 on the tractor. The rock arm 93 and the link 98 cooperate to guide the strap 97 for up and down movement relative to the tractor.

The rock arm 94 at the right end of the cross shaft 92 extends in the same direction as the rock arm 93, and another strap 101 (Fig. 3), corresponding to the strap 97, is pivoted on the rock arm 94 at 102 and connected at its lower end with a bracket 103 on the tractor by a link 104 (Fig. 2) corresponding to the link 98. The straps 97 and 101 carry a transverse beam 106 which has a pair of gusset plates 107 welded thereto adjacent to the straps 97 and 101, the gusset plates being rigidly secured, respectively, to the straps 97 and 101. The transverse beam 106 carries a pair of track eradicating tools, 108, 109 behind the rear wheels 1 and 2, respectively, of the tractor, and a third track eradicating tool 111 in position to loosen the soil on the track of the front wheels 3 and 4 of the tractor. The beam 106 and the track eradicating tools 108, 109 and 111 constitute a rear implement unit which is connected with the rock arms 93 and 94 for up and down movement relative to the tractor, and the rock arms are swingable in a generally up and down direction from an implement lowered position, as shown in Fig. 1, to an implement raised position, as shown in Fig. 4, and vice versa, about the axis of the cross shaft 92, that is, about fixed pivot centers or about a fixed pivot axis on the tractor.

A one-way actuating mechanism for moving the rock arms 93 and 94 from their implement lowered to their implement raised position comprises a hydraulic cylinder 112 which is pivoted on a pin 113 (Fig. 2) welded to the lower flange of the frame bar 18. A piston or plunger 114 cooperating with the hydraulic cylinder 112 is pivotally connected at 116 to a pair of arms 117 on the rock shaft 92. Secured to one of the arms 117, see Fig. 1, is a bracket 176 on which a crank screw 174 is adjustably mounted, and the right frame bar 18 of the tractor has an abutment at its rear end which is engageable by the screw 174 in order to limit implement lowering movement of the rock arms 93 and 94. The hydraulic cylinder 112 is connected by a hose 118 with a pump mechanism 119 mounted at the rear of the tractor and operable by the engine 12. The pump mechanism 119 is attached to a power take-off housing 120 enclosing suitable drive mechanism for the pump. A control mechanism, not shown, is incorporated in the pump mechanism, which permits, first, delivery of pressure fluid from the pump into the cylinder 112 at one side of the plunger 114 to cause movement of the plunger from the starting position in which it is shown in Figs. 1 and 2, to the position shown in Fig. 4, the latter position being reached by a full power stroke of the plunger 114; second, to stop delivery of pressure fluid to the cylinder 112 upon completion of the power stroke of the plunger 114, and at the same time to lock or entrap the pressure fluid in the cylinder 112, which prevents return movement of the plunger from the position in which it is shown in Fig. 4 to the position in which it is shown in Figs. 1 and 2; and third, to release the entrapped fluid in the cylinder 112, which permits return movement of the plunger 114 from the position in which it is shown in Fig. 4 to the position in which it is shown in Fig. 1. The valve mechanism is also such as to permit the pump mechanism to idle while the plunger 114 is in the position of Figs. 1 and 2, and during such idling movement of the pump no pressure fluid is effective in the cylinder 112 at either side of the plunger 114, so that the latter will neither be caused to move outwardly by fluid pressure at one side nor prevented from such outward movement by fluid pressure or by any entrapped fluid on the other side. Admission of pressure fluid into the cylinder 112 causes the plunger 114 to rotate the cross shaft 92 in an anticlockwise direction with reference to Fig. 1, and such anticlockwise rotation of the cross shaft causes the rock arms 93, 94 to move from their implement lowered to their implement raised position. The rearward implement unit is thereby raised from a working to a non-working position, and when the plunger 114 reaches the end of its power stroke the control mechanism may be operated to stop delivery of pressure fluid to the cylinder 112 and to entrap the pressure fluid in the cylinder so as to hold the rearward implement unit in its elevated position. Fig. 4 shows the position to which the rock arm 93 will be moved by a full stroke of the plunger 114, and the corresponding lifted position of the transverse beam 106, the transverse beam 106 being moved into said position by simultaneous upward movement of the rock arms 93 and 94.

Figure 3:
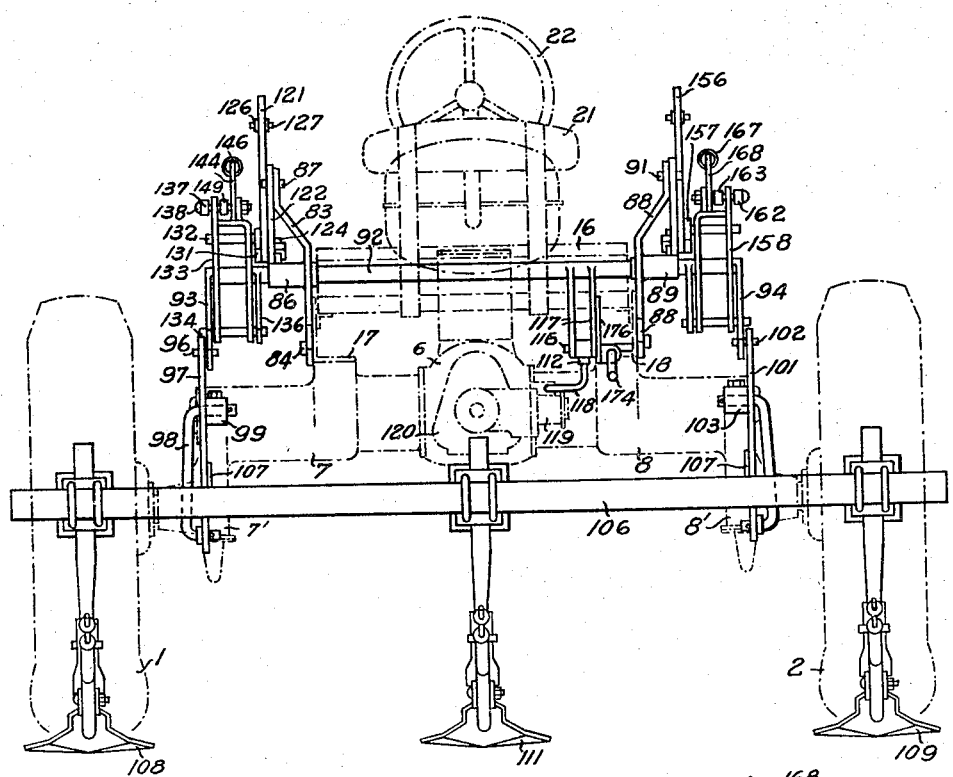
Fig. 3 is a rear view of the machine shown in Fig. 1.

The bracket 83 at the left side of the tractor has an upwardly extending portion affording a pivot center 87, as has been stated hereinbefore, and swingable on the pivot center 87 is a hand lever comprising a handle bar 121 and a crossbar 122 which is welded to the handle bar 121 and pivoted to the bracket 83 at the pivot center 87. A latch 123 is pivoted on the free end of the cross bar 122, and a notched segment 124 engageable by the latch 123 is secured in a fixed position on the bearing boss 86 of the bracket 83. The latch 123 is held by a suitable spring (not shown) in engagement with the notched segment 124 and may be released manually by means of a grip lever 126 which is pivoted on the handle bar 121, at 127, and connected with the latch 123 by a heavy wire 128. Pivoted on the rear end of the handle bar 121 at a first pivot center 129 is a first link 131 which has a second pivot center 132 at a distance from the pivot center 129 equal to the spacing of the pivot center 129 from the pivot center 87. Pivotally connected with the first link 131 at the second pivot center 132 is a second link 133 which has a pivotal connection with the arm 93 at a third pivot center 134. Referring to Fig. 3, it will be seen that the second link 133 has a relatively long arm adjacent to the rock arm 93 and a shorter arm adjacent to a second arm 136 of the cross shaft 92, a pin extending through the arms 93 and 136 of the cross shaft and through the arms of the second link 133, affording the mentioned third pivotal connection 134. Another pin extending through both arms of the second link 133 affords the second pivot center 132 on which the first link 131 is connected with the second link 133.

The outer arm of the second link 133 extends beyond the second pivot center 132, and a shoulder pin 137, best shown in Fig. 4, is pivotally connected to the upper end of the second link 133 at a fourth pivot center by means of a pivot pin 138. A tubular rod 139 is telescopically slidable, at its rear end, on the shoulder pin 137, and welded to the forward end of the tubular rod 139 is a nut 141. An eye-bolt 142 is threaded into the nut 141 and pivotally connected at its eye with the upper end of the lifting arm 73 on the lower draft link 61 by means of a pivot pin 143. Referring again to the second link 133 at the rear end of the cultivator, a rearwardly and upwardly extending bracket arm 144 is rigidly secured to the second link 133, and a coil spring 146 is hooked at one end into an eye at the upper end of the bracket arm 144. The other end of the spring 146 has a chain connection 147 with a lug 148 on the tubular rod 139.

Pivoted on the pin 138 is another shoulder pin 149 (Fig. 2) corresponding to the shoulder pin 137, and a second tubular rod 151 is telescopically movable at its rear end on the shoulder pin 149. The second tubular rod 151 is connected at its forward end with the lifting arm 77 of the lower draft link for the rig beam 74 in the same manner as has been described in connection with the rod 139, that is, an eye-bolt 152 is screwed into a nut at the forward end of the rod 151, and the eye-bolt 152 is pivotally connected with the lifting arm 77 of the lower draft link for the rig beam 74. The forward end of the spring 146 has a chain connection 153 with a lug 154 on the rod 151, as shown in Fig. 2.

The forward implement units at the right side of the tractor comprising the rig beams 78, 79 are operatively connected with the cross shaft 92 by a mechanism which is a duplicate of the mechanism at the left side of the tractor, which has been described hereinbefore, the mechanism at the right side, however, being arranged opposite hand relative to the mechanism at the left side, as may be seen from Figs. 2 and 3. The mechanism at the right side of the tractor comprises a handle bar 156 corresponding to the handle bar 121, the handle bar 156 being swingable about the mentioned pivot center 91 on the bracket 88 at the right side of the tractor and operatively connected with the cross shaft 92 by a first link 157 and second link 158, corresponding to the first link 131 and second link 133. A pair of tubular rods 159, 161 are pivotally and slidably connected with the second link 158 at the right side of the tractor by means of shoulder pins 162, 163 corresponding to the shoulder pins 137 and 149. Eye-bolts 164, 166 adjustably connect the rods 159, 161 with the lifting arms 81, 82 of the lower draft links for the rig beams 78 and 79. A spring 167 is hooked, at its rear end, into a bracket 168 (Fig. 3) on the second link 158 at the right side of the tractor, and a pair of chains 169, 171 connect the spring 167 with lugs 172, 173 on the rods 159, 161, respectively.

Considering the operation of the mechanism with reference to the forward implement units at the left side of the tractor, that is, the outer implement unit comprising the rig beam 56, and the inner implement unit comprising the rig beam 74, the following is to be noted. In the operative position of the front and rear implement units, as shown in Fig. 1, the rear end of the tubular rod 139 abuts against the shoulder of the shoulder pin 137, and the rear end of the tubular rod 151 likewise abuts against the shoulder of the shoulder pin 149, and the screw 174 rests against the abutment on the frame bar 18 of the tractor. The chains 147 and 153 are adjusted to such length that when the mechanism occupies the position shown in Fig. 1 the spring 146 is under considerable tension which will be effective to force the rods 139 and 151 and the shoulder pins 137 and 149 towards each other and cause the rear ends of the rods to bear solidly under considerable pressure against the shoulder pins, at least as long as the front implement units are not subject to an abnormal upward thrust while they are drawn through the ground. The upper and lower draft links 61 and 62, of the outer unit extend rearwardly and downwardly from the bracket 54 at a relatively small angle relative to the horizontal, and when the tractor advances, the draft force acts upon the rig beam 56 in the direction of the axis of the lower link 61 and may be considered as the resultant of a horizontal component and a vertical component, the latter exerting a lifting effect upon the rig beam 56 proportional to the draft force. This lifting effect of the vertical component of the draft force is counteracted by the weight of the outer implement unit connected with the rear ends of the links 61, 62 plus one-half of the weight of the links 61 and 62. The shovel 68, when drawn through the ground, develops a suction force which acts vertically in a downward direction and which, like the mentioned weight of the outer implement unit and one-half of the weight of the links 61 and 62, counteracts the lifting effect of the vertical component of the draft force. While the tractor advances, the soil resistance encountered by the shovel 68 may vary as the shovel runs into hard and soft spots of the ground and into local rises and hollows of the ground, with the result that the draft force alternately increases and decreases. A certain soil resistance, however, may be assumed to be prevalent as a normal working condition, and under said normal working condition the combined gravitational and suction forces acting upon the outer implement unit overbalance the vertical component of the draft force. This result is obtained without excessive weight of the implement unit and with ordinary suction of the shovel or shovels mounted on the rig beam 56 due to the relatively small angle of the links 61 and 62 relative to the horizontal.

Due to the superiority of the combined gravitational and suction forces over the vertical component of the draft force, under normal working conditions, the lifting arm 73 exerts a rearward push upon the rod 139, which is transmitted to the shoulder pin 137, and augments the pressure of the rod 139 against the shoulder pin 137 set up by the spring 146.

The inner forward implement unit at the left side of the tractor, that is, the one comprising the rig beam 74, performs in the same manner as has been discussed hereinbefore in connection with the outer one comprising the rig beam 56. In other words, the rod 151 is likewise subjected to a rearward push under normal working conditions, and such rearward push acts upon the shoulder pin 149 and augments the pressure of the rod 151 against the shoulder pin 149 set up by the spring 146. Considering for the moment only the combined rearward push of the rods 139 and 151 resulting from the gravitational and suction forces of the front implement units at the left side of the tractor, as explained hereinbefore, such combined rearward push acts upon the second link 133 at the fourth pivot center 138, and is taken up by the tractor, part of said rearward push being transmitted from said second link to the rock arm 93, cross shaft 92, and adjusting screw 174, and another part being transmitted from the second link 133 to the first link 131, and hand lever 121, 122, the hand lever 121, 122 being normally locked on the bracket 83 by means of the latch 123 engaging the segment 124. As a result, rearward movement of the rods 139 and 151 is positively prevented while the screw 174 engages the abutment on the frame bar 18 of the tractor and the hand lever 121, 122 is locked on the bracket 83.

Assuming now that the shovels 68 and 76 run into a soft spot or a hollow which will cause a decrease of the draft force. Such a condition will have no effect upon the position of the shovels because it results merely in an increased rearward push upon the rods 139 and 151 due to a decrease of the vertical components of the draft forces which counteract the combined gravitational and suction forces on the forward implement units at the left side of the tractor, and the increased rearward push on the rods 139 and 151 is taken up at the shoulder pins 139 and 149 which cannot move rearwardly from the position in which they are shown in Fig. 1.

The result is entirely different, however, if the shovels 68 and 76 should run into a hard spot or into a local rise of the ground. In that case the draft forces increase and it may first be assumed for purposes of explanation that their vertical components become strong enough to balance the combined gravitational and suction forces of the inner and outer forward implement units at the left side of the tractor, and also the initial tension of the spring 146. This will leave the rods 139 and 151 in the position in which they are shown in Figs. 1 and 2, but the rods will no longer exert a rearward pressure upon the shoulder pins 137 and 149. Assuming next that the draft forces increase still further, it is evident that the rods 139 and 151 will then slide forwardly on the shoulder pins, permitting the front implement units to rise, but upward movement of the front implement units will be strongly resisted by the spring 146. When the vertical components of the draft forces become strong enough to lift the implement units against the restraining force of the spring 146, the resulting upward movement of the shovels 68 and 76 causes a decrease of the soil resistance encountered by the shovels and consequently a decrease of the draft forces. The shovels will therefore rise only an amount sufficient to establish a state of equilibrium between the increased vertical components of the draft forces, at the one hand, and the combined gravitational and suction forces plus the tension of the spring 146, on the other hand. In other words, if the shovels run into hard ground or into a local rise of the ground, the shovels will not jump out of the ground but stay in and merely ride at a somewhat different depth than under normal working conditions.

Referring to Fig. 1, it will be noted that the outer front implement unit is connected with the hydraulic jack 112, 114 by a mechanism which comprises two sections, namely, a first one having fixed pivot centers at 58 and 92, and movable pivot centers at 143, 138, and 134; and a second section having a fixed pivot center at 129 and a movable pivot center at 132. The rod 139 and the shoulder pin 137 bearing normally solid upon each other may be considered as a reciprocable link of the first section, and the second link 133 may be considered as another reciprocable link of the first section, while the lifting arm 73 and the rock arm 93 may be considered as swingable arms of the first section. The tension of the spring 146 tends to shift the first section towards a position in which the reciprocable link constituted by the link 133 would aline longitudinally with the reciprocable link constituted by the rod 139 and the shoulder pin 137, but such tendency of the spring 146 remains substantially ineffective, in the position of the parts shown in Fig. 1, because the line on which the spring 146 acts between the lug 148 and the bracket arm 144 of the second link 133 extends in relatively close proximity to the pivot center 138. Operation of the hydraulic jack comprising the cylinder 112 and the plunger 114 so as to swing the rock arm 93 from the position shown in Fig. 1 to the position shown in Fig. 4, causes the line of action of the spring 146 to move farther away from the pivot center 138, and as the mechanism moves from the position shown in Fig. 1 towards the position shown in Fig. 4, the spring 146 becomes increasingly effective to exert a lifting force upon the front and rear implement units.

The rod 151 and shoulder pin 149 perform in the same manner as the rod 139 and the shoulder pin 137, and what has been said hereinbefore regarding the tendency of the spring 146 to aline the second link 133 with the rod 139 also applies to the rod 151. That is, when the mechanism moves from the position shown in Fig. 1 towards the position shown in Fig. 4, the spring 146 becomes increasingly effective to assist upward movement of the rear implement unit and of both forward implement units at the left side of the tractor. The spring 167 at the right side of the tractor functions in the same manner as the spring 146, at the left side of the tractor to assist upward movement of the rear implement unit and of the front implement units at the right side of the tractor.

The springs 146 and 167, therefore, perform two functions, first to hold the forward implement units in the ground when the front shovels run into hard ground and under similar adverse operating conditions, and second to facilitate the raising of the front and rear implement units. The latter function of the springs is of particular advantage if instead of a power actuated mechanism such as the hydraulic jack 112, 114 a manually operated lifting lever is employed.

Referring to the lever comprising the handle bar 121 and cross arm 122, it will be noted that adjustment of this lever about its pivot axis at 87, while the rock arm 93 is positioned as shown in Fig. 1, changes the operating depth of the cultivating shovels 68 and 76. As shown in Fig. 6, adjustment of said lever in a downward direction is effective to swing the reciprocable element constituted by the link 133 rearwardly about the pivot center 134, with the result that the reciprocable elements constituted by the rods 139, 151 and their respective shoulder pins 137 and 149 are moved rearwardly and the shovels 68 and 76 are adjusted to a greater depth of soil penetration than shown in Fig. 1. On the other hand, as shown in Fig. 7, adjustment of the lever 121, 122 in an upward direction from the position in which it is shown in Fig. 1 moves the shovels 68 and 76 to a position of shallower soil penetration. The mechanism at the right side of the tractor, which connects the cross shaft 92 with the implement units comprising the rig beams 78 and 79 operates in the same manner as the mechanism at the left side of the tractor, and what has been said hereinbefore regarding the operation of the hand lever 121, 122 at the left side of the tractor similarly applies to the hand lever 156 at the right side of the tractor.

Admission of pressure fluid into the cylinder 112 causes anticlockwise rotation of the cross shaft 92, as viewed in Fig. 1, and consequently upward movement of the rock arm 93 from the position in which it is shown in said figure. The link 131, referred to hereinbefore as a first link, being connected with the rock arm 93 through the link 133 which has been referred to hereinbefore as a second link, is swung upwardly about its first pivot center at 129 by such upward movement of the rock arm 93, and the second pivot center 132 at which the first link is connected to second link 133 moves in an arc about the first pivot center 129, while the third pivot center 134 at which the second link is connected with the rock arm 93 moves in an arc about the fixed pivot center of said arm at 92. As a result, the fourth pivot center 138 at which the shoulder pin 137 is connected to the second link 133 moves upwardly and forwardly, and the lifting arm 73 is swung forwardly about its pivot center at 58. As stated hereinbefore, the spacing of the second pivot center 132 from the first pivot center 129 is equal, or substantially equal, to the spacing of the first pivot center 129 from the pivot axis 87 of the hand lever 121, 122 on the bracket 83, and the travel of the plunger 114 is limited so that at the end of the power stroke of the plunger the second pivot center 132 coincides, or substantially coincides with the pivot axis 87 of the hand lever 121, 122, as shown in Fig. 4. It will be noted that in the position of the mechanism shown in Fig. 4 the hand lever 121, 122 may be moved about its pivot center at 87 to any position of adjustment along the segment 124 without causing movement of the link 133 and consequent up and down movement of the front implement units at the left side of the tractor. In other words, irrespective of the position to which the hand lever 121, 122 has been adjusted to obtain any desired depth of soil penetration of the cultivating shovels 68 and 76 in normal operation, upward movement of the rock arm 93 by a full stroke of the plunger 114 will raise the cultivating shovels 68 and 76 to a predetermined height above the ground, and the hand lever 121, 122 may be adjusted to its extreme lower or to its extreme upper position without affecting the height to which the forward implement units are raised above the ground by a full stroke of the plunger 114. The mechanism which connects the cross shaft 92 with the front tools at the left side of the tractor therefore functions in the manner of a constant height lift mechanism, and the mechanism which connects the cross shaft 92 with the front tools at the right side of the tractor, being an opposite hand duplicate of the lift mechanism at the left side of the tractor, also functions in the manner of a constant height lift mechanism.

In the inoperative position of the cultivator, as shown in Fig. 4, the weight of the implement unit connected with the bracket 54 tends to swing the lifting arm 73 in a rearward direction resulting in a backward push upon the tubular rod 139, and the tubular rods 151, 159 and 161 are similarly subjected to a rearward push in the raised position of the implement due to the weight of the forward implement units connected with said rods. The rearward push acting upon the rods 139 and 151 in the raised position of the cultivator, due to the weight of the forward implement units at the left side of the tractor, is transmitted in part through the second link 133 to the rock arm 93, and in part through the second link 133, the first link 131, handle bar 121 and cross bar 122 to the pivot center 87 on the bracket 83 which is fixed on the tractor. Similarly, the rearward push acting upon the rods 159 and 161 in the raised position of the cultivator, due to the weight of the forward implement units at the right side of the tractor, is transmitted in part through the second link 158 to the rock arm 94, and in part through the link 157, handle bar 156 and its cross arm to the bracket 88 on the tractor. The weight components of the forward implement units at the left and right sides of the tractor, which are transmitted to the rock arms 93 and 94 through the links 133 and 158 in the raised position of the cultivator tend to rotate the cross shaft 92 in a clockwise direction as viewed in Fig. 4, and the weight of the rearward implement unit comprising the transverse beam 106 and track eradicating tools 108, 109, 111 also tends to rotate the cross shaft 92 in clockwise direction as viewed in Fig. 4.

The weight of all forward implement units and the weight of the entire rear implement unit will therefore cooperate to produce a torque upon the cross shaft 92 in a clockwise direction, as viewed in Fig. 4, which torque will become effective to rotate the cross shaft, upon release of the fluid which is entrapped in the cylinder 112 in order to hold the forward and rearward implement units in their inoperative positions. The clockwise rotation of the cross shaft 92 will continue until the crank screw 174 which is mounted in the bracket 176 on one of the arms 117 of the cross shaft engages the abutment on the right frame bar 18 of the tractor. The depth to which the track eradicating tools penetrate the ground may be adjusted by rotation of the crank screw 174, while the normal depth to which the forward cultivating shovels penetrate the ground may be adjusted by the hand levers 121 and 156 as has been explained hereinbefore.

When the lift mechanisms at the right and left sides of the tractor are operated by a power stroke of the hydraulic jack 112, 114 the springs 146 and 167 contract to some extent, and clockwise rotation of the cross shaft 92 from the position shown in Fig. 4 into the position shown in Fig. 1 will elongate the springs, with the result that a substantial part of the potential energy of the raised front and rear implement units will be stored in the springs by gravitational movement of the front and rear implement units from their raised to their lowered positions. The energy thus stored in the springs becomes effective upon upward movement of the rock arms 93 and 94, to cause a reduction of the lifting effort for moving the front and rear implement units to their inoperative positions, as has been mentioned hereinbefore. Clockwise rotation of the cross shaft 92 towards the position in which it is shown in Fig. 1 will also be effective to return the plunger 114 to its starting position within the cylinder 112, and the return movement of the plunger will transfer the fluid from the cylinder 112 through the hose 118 back into a sump within the power take-off housing 120.

When the machine traverses a field with the tools lowered to operative positions, a stone or other obstruction may be encountered by one of the front shovels, and the corresponding rig beam may be forced upwardly from its normal operating position. Assuming that such action takes place on the rig beam 56, it will be seen that the rod 139 will be pulled forwardly, but such forward pull will not be transmitted to the adjacent rod 151, since the chain 147 takes the whole pull, while the chain 153 slackens and relieves the rod 151 from the tension of the spring 146, but the rig beam 74 will not rise as long as the soil resistance encountered by the shovel or shovels of the rig beam 74 remains normal, in which case the gravitational and suction forces on the rig beam 74 overbalance the vertical component of the draft force transmitted to the rig beam 74, and the rod 151 is subject to rearward push in spite of the slackening of the chain 158. However, the rearward push of the rod 151 is relatively small compared with the forward pull on the rod 139, which has been assumed to be sufficient to overcome the initial tension of the spring 146, and when the mentioned conditions are incurred the link 133 therefore becomes subject to a forward pull which tends to swing it forwardly about the pivot center 134 on the rock arm 93. A similar tendency of the link 133 to swing forwardly about the pivot center 134 while the rock arm 93 is in its implement lowered position occurs whenever the draft forces upon the front implement units at the left side of the tractor increase to such an extent that the gravitational and suction forces are no longer sufficient to hold said implement units in their working positions.

In the position of the mechanism as shown in Fig. 6 the link 133 is practically prevented from swinging forwardly about the pivot center 134 whenever one or both of the forward implement units at the left side of the tractor should become subjected to an abnormally strong upwardly directed reactive force, and which condition may be incurred, as stated, when a rock, or a hard spot or a local rise of the ground is encountered by one or both forward implement units at the left side of the tractor. In the position of the mechanism as shown in Fig. 6, the first link 131 occupies a toggle position relative to the reciprocable link or thrust element constituted by the rod 139 and shoulder pin 137; and the first link is subject to compression by a forward pull on one or both of the rods 139 and 151, which is transmitted to the spring 146 and to the second link 133. Due to the mentioned toggle position, the first link 131 is effectively prevented, or at least substantially restrained from swinging upwardly about its first pivot center 129; the second link 133 is effectively prevented or at least substantially restrained from swinging forwardly about the third pivot center 134; and the position of the rock arm 93 is such that the rock arm 93 is also effectively prevented or at least substantially restrained from swinging upwardly about its pivot center or pivot axis at 92, under a forward pull on one or both of the rods 139 and 151. Consequently, when the front implement units at the left side of the tractor run into a hard spot or into a local rise of the ground, or under any conditions subjecting one or both of said implement units to an abnormally strong upwardly directed reactive force, the part of the mechanism comprising the rock arm 93, the first link 131 and the second link 133 will be effectively prevented or at least substantially restrained from moving out of the position in which it is shown in Fig. 6, although the hydraulic jack 112, 114 is practically ineffective to restrain upward movement of the rock arm 93. The accomplishment of this result is also largely independent of any other restraining force upon the rock arm 93, such as the gravitational force of the rear implement unit.

Referring to Figs. 1, 6 and 7, it will be noted that the mentioned toggle position of the first link 131 is affected very little by up and down adjustment of the hand lever 121, 122; and upward and forward swinging movement of the second link 133, and upward swinging movement of the rock arm 93 will be effectively opposed in the manner mentioned hereinbefore, in any position of adjustment of the hand lever 121, 122.

As stated hereinbefore, the chains 147 and 153 are adjusted to such lengths that when the mechanism occupies the position shown in Fig. 1, the spring 146 is under considerable tension, and adjustment of the hand lever 121, 122 from the position shown in Fig. 1 to the position shown in Fig. 6, while the rock arm 93 is in its implement lowered position, will be effective to increase the tension of the spring 146 to some extent. The lifting effect of the spring 146 upon the front and rear implement units, however, is relatively low in any position to which the hand lever 121, 122 may be adjusted while the rock arm 93 is in its implement lowered position, and the spring 146, therefore, may be tensioned considerably without subjecting the front and rear implement units to an appreciable lifting effect by the spring 146 while the link 131 occupies the mentioned toggle position. It will be noted that the toggle position of the first link 131 relative to the reciprocable link 139, 137, or the toggle position of the reciprocable link 139, 137 relative to the first link 131 is such as to afford a relatively small lever ratio between the lifting arm 73 and the first link 131, and so as to afford a relatively large lever ratio between the rock arm 93 and the first link 131.

When the mechanism occupies the position shown in Fig. 6, and the rod 139 becomes subjected to a forward pull, as mentioned hereinbefore, such forward pull may be considered, for purposes of analysis, as being equivalent to a forward pull on the dash-dotted line A through the fourth pivot center 138 and through the point at which the rod 139 is pivoted on the lifting arm 73 by means of the pivot pin 143, the line A representing the effective line of thrust on which the thrust element comprising the rod 139 is positioned when the front implement unit is in its working position and the rock arm 93 is in its implement lowered position. The dash-dotted line B through the first pivot center 129 and through the second pivot center 132 intersects the dash-dotted line C through the third pivot center 134 and through the pivot center or pivot axis 92 at a point X, and the line A extends in close proximity to said point X. If the line A would extend exactly through the point X the link and lever system connecting the front implement unit at the left side of the tractor with the hydraulic jack 112, 114 would be in a dead center position, from which it could not be moved by any force acting forwardly on the line A. It should be noted, however, that the link and lever system could be moved very readily out of said dead center position by the admission of fluid pressure into the hydraulic cylinder 112, or by the application of a rotative force to the rock arm 93 in any other manner, which would tend to swing the rock arm 93 upwardly from its implement lowered to its implement raised position. The link and lever system has pivot centers on the traveling support, at 92 and at 129, and a pivot center on the lifting arm 73 at 143, and the link and lever system is so arranged that when the lifting arm 73 occupies its implement lowered position and the plunger 114 or actuating element occupies its starting position, the link and lever system occupies a toggle position sufficiently close to said dead center position to afford a relatively high initial resistance against movement thereof out of said toggle position in a direction away from said dead center position under a reactive force upon the outer front implement unit at the left side of the tractor, or upon the lifting arm 73, and a relatively low resistance against said movement thereof out of said toggle position by rearward movement of the plunger 114, under hydraulic pressure, from its starting position.

The hand lever 121, 122 constitutes an adjustable element on the traveling support, and when the hand lever is adjusted from the position shown in Fig. 6 to the position shown in Fig. 7, the intersection point X moves on the line C a very short distance towards the pivot axis 92, and adjustment of the hand lever or adjustable element is therefore substantially ineffective to displace the intersection point X relative to the machine. The line A moves somewhat away from the intersection point X when the hand lever is adjusted from the position shown in Fig. 6 to the position shown in Fig. 7, but it still extends in relatively close proximity to the intersection point X. In other words, any position to which the link and lever system may be adjusted by movement of the hand lever 121, 122 when the lifting arm 73 and the rock arm 93 are in their implement lowered positions, will be sufficiently close to the mentioned dead center position to afford a relatively high initial resistance against movement of the link and lever system under a reactive force upon the lifting arm 73 and a relatively low resistance against operation by the hydraulic jack 112, 114.

The foregoing considerations similarly apply to the implement unit comprising the rig beam 74 which is operatively connected with the rod 151. The implement adjusting mechanism at the right side of the tractor and the front implement units comprising the rig beams 78 and 79 perform in the same manner as the implement adjusting mechanism at the left side of the tractor and the front implement units comprising the rig beams 56 and 74; and what has been said hereinbefore about the link and lever system at the left side of the tractor also applies to the implement adjusting mechanism at the right side of the tractor.

While in the foregoing a preferred embodiment of the invention has been described with reference to the drawings, it should be understood that it is not intended to limit the invention to the exact details of construction herein shown and described, for various modifications within the scope of the appended claims may occur to persons skilled in the art.

It is claimed and desired to secure by Letters Patent:

1. In an agricultural machine, a traveling support, an implement movably mounted on said traveling support, and adjusting means for said implement comprising, a lever pivotally adjustable on said traveling support to different positions, a first link having relatively spaced pivot centers, one fixed on said lever at a distance from the pivot axis thereof substantially equal to the spacing between said pivot centers to permit movement of said first link into a registering position in which the other pivot center of said first link substantially coincides with the pivot axis of said lever, a second link pivotally connected with said first link at said other pivot center thereof, a rock arm pivotally connected with said second link and swingable on said traveling support about a fixed center spaced from the pivot axis of said lever, actuating means operatively connected with said rock arm for moving said first link into and out of said registering position thereof, and means operatively connecting said implement with said links.

2. In an agricultural machine, a traveling support, an implement movably mounted on said traveling support, and adjusting means for said implement comprising, a lever pivotally adjustable on said traveling support to different positions, a first link having relatively spaced pivot centers, one fixed on said lever at a distance from the pivot axis thereof substantially equal to the spacing between said pivot centers to permit movement of said first link into a registering position in which the other pivot center of said first link substantially coincides with the pivot axis of said lever, a second link pivotally connected with said first link at said other pivot center thereof, a rock arm pivotally connected with said second link and swingable on said traveling support about a fixed center spaced from the pivot axis of said lever, actuating means operatively connected with said rock arm for moving said first link into and out of said registering position thereof, and an operating connection between said rock arm and said implement comprising a reciprocable element pivoted on said second link and operatively connected with said implement.

3. In an agricultural machine, a traveling support, a lever pivotally adjustable on said traveling support to different positions, a first link having relatively spaced pivot centers, one fixed on said lever at a distance from the pivot axis thereof substantially equal to the spacing between said pivot centers of said first link to permit movement of the latter into a registering position in which the other pivot center of said first link substantially coincides with the pivot axis of said lever, a second link pivotally connected with said first link at said other pivot center thereof, a rock arm having a fixed pivot center on said traveling support and pivotally connected with said second link, actuating means cooperating with said rock arm for moving said first link into and out of said registering position, a first implement unit movably mounted on said traveling support, an operating connection between said rock arm and said first implement unit comprising a reciprocable element pivoted on said second link and operatively connected with said first implement unit, and a second implement unit connected with said rock arm for movement thereby relative to said traveling support.

4. In an agricultural machine, a traveling support, a lifting arm and a rock arm pivotally mounted independently of each other on said traveling support, a link swingable about a pivot center on said traveling support, means connecting one of said arms with said link, and a reciprocable element operatively connected with the other of said arms and with said connecting means, whereby said reciprocable element and link may be moved into a predetermined toggle position relative to each other, affording a relatively small lever ratio between said lifting arm and said link, and a relatively large lever ratio between said rock arm and said link, and first and second implement units connected, respectively, with said arms independently of said connecting means and tending, by their weight, to move said reciprocable element and link towards said toggle position.

5. In an agricultural machine, a traveling support, a lifting arm and a rock arm pivotally mounted independently of each other on said traveling support, a link swingable about a pivot center on said traveling support, means connecting one of said arms with said link, and a reciprocable element operatively connected with the other said arms and with said connecting means, whereby said reciprocable element and link may be moved into a predetermined toggle position relative to each other, affording a relatively small lever ratio between said lifting arm and said link, and a relatively large lever ratio between said rock arm and said link, first and second implement units connected, respectively, with said arms independently of said connecting means and tending, by their weight, to move said reciprocable element and link towards said toggle position, and stop means operatively connected with said rock arm for preventing said reciprocable element from moving beyond said toggle position.

6. In an agricultural machine, a traveling support, a lifting arm and a rock arm pivotally mounted independently of each other on said traveling support, a link swingable about a pivot center on said traveling support, means connecting one of said arms with said link, and a reciprocable element operatively connected with the other of said arms and with said connecting means, whereby said reciprocable element and link may be moved into a predetermined toggle position relative to each other, affording a relatively small lever ratio between said lifting arm and said link, and a relatively large lever ratio between said rock arm and said link, first and second implement units connected, respectively, with said arms independently of said connecting means and tending, by their weight, to move said reciprocable element and link towards said toggle position, and adjustable stop means including relatively abuttable elements, one operatively connected with said rock arm and the other with said traveling support for preventing said reciprocable element from moving beyond said toggle position.

7. In an agricultural machine, a traveling support, a lifting arm and a rock arm pivotally mounted independently of each other on said traveling support, a lever adjustable to different positions about a fixed pivot center on said traveling support, a link swingable about another pivot center on said lever spaced from said fixed pivot center, means independent of said link for locking said lever in different positions of adjustment, means connecting one of said arms with said link, a reciprocable element operatively connected with the other of said arms and with said connecting means whereby said reciprocable element and link may be moved into a toggle position relative to each other, in any pivotally adjusted position of said lever, affording a relatively small lever ratio between said lifting arm and said link, and a relatively large lever ratio between said rock arm and said link, first and second implement units connected, respectively, with said arms independently of said connecting means and tending, by their weight, to move said reciprocable element and link towards said toggle position, and stop means operatively connected with said rock arm for preventing said reciprocable element from moving beyond said toggle position.

8. In an agricultural machine, a traveling support, a lifting arm and a rock arm pivotally mounted independently of each other on said traveling support, a link swingable about a pivot center on said traveling support, a thrust transmitting connection between said rock arm and said link, a reciprocable element operatively connected with said lifting arm, means operatively connecting said reciprocable element with said thrust transmitting connection, whereby movement of said arms in one direction will move said reciprocable element into a predetermined toggle position relative to said link, affording a relatively small lever ratio between said lifting arm and said link, and a relatively large lever ratio between said rock arm and said link, and whereby movement of said rock arm in the opposite direction will positively move said reciprocable element from said toggle position, first and second implement units connected, respectively, with said arms independently of said thrust transmitting connection and tending, by their weight, to move said arms in said one direction, and a one-way actuating mechanism operatively connected with said rock arm and operable to move said reciprocable element from said toggle position for raising said implement units.

9. In an agricultural machine, a traveling support, a lifting arm and a rock arm pivotally mounted independently of each other on said traveling support, a first link swingable about a pivot center on said traveling support, a second link pivotally connected with said first link and with said rock arm, a reciprocable element operatively connected with said links and with said lifting arm, whereby said reciprocable element may be moved into a toggle position relative to said first link affording a relatively small lever ratio between said lifting arm and said first link, and a relatively large lever ratio between said rock arm and said first link, and first and second implement units connected, respectively, with said arms independently of said second link and tending, by their weight, to move said reciprocable element towards said toggle position.

10. In an agricultural machine, a traveling support, a first implement unit mounted on said support for up and down movement relative thereto, a lifting arm connected with said first implement unit and swingable, by gravitational movement of said first implement unit, into an implement lowered position, a rock arm having a fixed pivot center on said traveling support, a pair of pivotally connected links having pivot centers, respectively, on said traveling support and on said rock arm, a second implement unit connected with said rock arm, independently of said links, and tending by its weight to move said rock arm towards an implement lowered position, actuating means connected with said rock arm and operable to move said rock arm to an implement raised position, and a reciprocable element connected with said lifting arm and with one of said links, said reciprocable element, links and rock arm being so arranged that when said lifting and rock arms occupy said implement lowered positions, respectively, said rock arm, links and reciprocable element occupy a toggle position sufficiently close to a dead center position thereof to afford a relatively high initial resistance against movement out of said toggle position under a reactive force upon said first implement unit, and a relatively low resistance against said movement thereof out of said toggle position by movement of said rock arm towards an implement raised position by operation of said actuating means.

11. In an agricultural machine, a traveling support, an implement unit mounted on said support for up and down movement relative thereto, a lifting arm connected with said implement unit and swingable, by gravitational movement of said implement unit, into an implement lowered position, a hydraulic jack mounted on said support comprising a cylinder and a piston movable therein from a starting position by admission of fluid pressure into said cylinder at one side of said piston, a rock arm having a fixed pivot center on said traveling support, means connecting said rock arm with said piston, a pair of pivotally connected links having pivot centers, respectively, on said traveling support and on said rock arm, and a reciprocable element connected with one of said links and with said lifting arm for moving said lifting arm from its implement lowered to an implement raised position by said admission of fluid pressure into said cylinder and for returning said piston to said starting position, upon release of said fluid pressure, by said gravitational movement of said implement unit, said rock arm, links and reciprocable element and being so arranged that when said lifting arm and said piston occupy said implement lowered and said starting positions, respectively, said rock arm, links and reciprocable element occupy a toggle position sufficiently close to a dead center position to afford a relatively high initial resistance, independently of said hydraulic jack, against movement thereof out of said toggle position under a reactive force upon said implement unit and a relatively low resistance against said movement thereof out of said toggle position by said admission of pressure fluid into said cylinder.

12. In an agricultural machine, a traveling support, a lifting arm and a rock arm swingable on said support from implement lowered to implement raised positions, and vice versa, a pair of pivotally connected first and second links having pivot centers, respectively, on said traveling support and on said rock arm, a reciprocable element pivoted at one end thereof on said lifting arm and having a pivotal supporting connection, at its other end, on said second link, and first and second implement units operatively connected, respectively with said lifting and rock arms, independently of said second link, said rock arm, links and reciprocable element being so arranged that when said arms occupy said implement lowered positions, said rock arm, links and reciprocable element occupy a toggle position sufficiently close to a dead center position to afford a relatively high initial resistance against movement thereof out of said toggle position under a reactive force upon said lifting arm and a relatively low resistance against said movement thereof out of said toggle position by said movement of said rock arm from its implement lowered to its implement raised position.

13. In an agricultural machine, a traveling support, a rock arm swingable on said support from implement lowered to implement raised positions, and vice versa, a hydraulic jack mounted on said support comprising a cylinder and a piston movable therein from a starting position by admission of pressure fluid into said cylinder at one side of said piston, means connecting said hydraulic jack with said rock arm for swinging the latter from its implement lowered to its implement raised position by said admission of pressure fluid into said cylinder and for returning said piston to said starting position by movement of said rock arm from its implement raised to its implement lowered position, a pair of pivotally connected first and second links having pivot centers, respectively, on said traveling support and on said rock arm, a first implement unit mounted on said support for movement relative thereto from a lowered to a raised position, and vice-versa, a thrust transmitting element connected to said first implement unit and to said second link, so that when said rock arm is in its implement lowered position said thrust transmitting element, links and rock arm occupy a toggle position sufficiently close to a dead center position to afford a relatively high initial resistance, independently of said hydraulic jack, against movement thereof out of said toggle position under a reactive force upon said first implement unit, and a relatively low resistance against said movement thereof out of said toggle position by said movement of said rock arm from its implement lowered to its implement raised position and a second implement unit connected with said rock arm independently of said second link, whereby admission of pressure fluid into said cylinder will become effective to raise said first and second implement units, and gravitational movement of said first and second implement units from their raised positions, upon release of fluid pressure within said cylinder will become effective to return said piston to its starting position.

14. In an agricultural machine, a traveling support, a lifting arm and a rock arm swingable on said support from implement lowered to implement raised positions, and vice versa, actuating means connected with said rock arm for swinging said rock arm from an implement lowered to an implement raised position, a control element adjustably mounted on said support and lockable in different positions of adjustment relative thereto, a pair of pivotally connected first and second links having pivot centers, respectively, on said control element and on said rock arm, a reciprocable element connected with said lifting arm and with said second link, operable to transmit swinging movement of said rock arm by said actuating means, to said lifting arm and to adjust the implement lowered position of said lifting arm relative to the implement lowered position of said rock arm by adjustment of said control element, said reciprocable element and links being so arranged that any of the positions thereof to which they may be moved by adjustment of said control element while said rock arm is in its lowered position, will be sufficiently close to a dead center position to place said reciprocable element, links and rock arm into a toggle position affording a relatively high initial resistance against movement of said reciprocable element, links and rock arm out of said toggle position under a reactive force upon said lifting arm, and a relatively low resistance against said movement thereof out of said toggle position when said actuating means are operated to swing said rock arm from its implement lowered to its implement raised position.

15. In an agricultural machine, a traveling support, an implement unit mounted on said support for up and down movement relative thereto, a lifting arm connected with said implement unit and movable about a fixed pivot center on said support from an implement lowered to an implement raised position, and vice versa, a first link having a first pivot center on said support and a second pivot center swingable about said first pivot center, a rock arm having a fixed pivot center on said support, a second link having a pivot connection with said first link at said second pivot center and another pivot connection, at a third pivot center, with said rock arm in such relation to said fixed pivot center of the latter that movement of said rock arm about its fixed pivot center in one direction will cause movement of said first link about said first pivot center in the same direction, a reciprocable element having a pivot connection at a fourth pivot center with said second link, means pivotally connecting said reciprocable element with said lifting arm, at a point movable about said fixed pivot center thereof by said movements of said lifting arm, and means for moving said rock arm about its fixed pivot center from a first to a second predetermined position, whereby said lifting arm will be moved from its implement lowered to its implement raised position, the relative arrangement of said pivot centers being such that when said lifting and rock arms are in said implement lowered and first predetermined positions, respectively, a line extending through said first and second pivot centers, and a line extending through the fixed pivot center of said rock arm and through said third pivot center intersect each other at a point in proximity to a line extending through said point on said lifting arm and through said fourth pivot center.

16. In an agricultural machine, a traveling support, a first implement unit mounted on said support for up and down movement relative thereto, a lifting arm connected with said first implement unit and movable by gravitational movement of said first implement unit, about a fixed pivot center on said support from an implement raised to an implement lowered position, a first link having a first pivot center on said support and a second pivot center swingable about said first pivot center, a rock arm having a fixed pivot center on said support and a third pivot center movable therewith about said fixed pivot center of said rock arm, a second link having pivot connections with said first link and with said rock arm at said second and third pivot centers, respectively, a second implement unit connected with said rock arm independently of said second link, whereby gravitational movement of said second implement unit will become effective to swing said rock arm about said fixed pivot center thereof, a reciprocable element having a pivot connection at a fourth pivot center with said second link, means pivotally connecting said reciprocable element with said lifting arm at a point movable about said fixed pivot center thereof by said movement of said lifting arm, a hydraulic jack mounted on said support comprising a cylinder and a piston movable therein from a starting position by admission of fluid pressure into said cylinder at one side of said piston, and means operatively connecting said rock arm with said hydraulic jack whereby said first and second implement units will be moved from lowered to raised positions by said admission of fluid pressure into said cylinder and whereby said piston will be returned to said starting position, upon release of said fluid pressure, by said gravitational movement of said implement units, the relative arrangement of said pivot centers being such that when said lifting arm and said piston are in said implement lowered and starting positions, respectively, a line extending through said first and second pivot centers, and a line extending through the fixed pivot center of said rock arm and through said third pivot center intersect each other at a point in proximity to a line extending through said point on said lifting arm and through said fourth pivot center.

17. In an agricultural machine, a traveling support, an implement unit mounted on said support for up and down movement relative thereto, a rock arm movable about a fixed pivot center on said support from a first to a second predetermined position, and vice versa, a first link having a first pivot center on said support and a second pivot center swingable about said first pivot center, a second link swingably connected at said second pivot center with said first link and at a third pivot center with said rock arm in such relation to said fixed pivot center of the latter that movement of said rock arm in one direction about its fixed pivot center will cause movement of said first link in the same direction about said first pivot center, a thrust element pivoted on said second link, and means operatively connecting said thrust element with said implement unit, whereby movement of said rock arm from said first to said second predetermined position will raise said implement unit from a working to a non-working position, said connecting means being so arranged that when said implement unit and said rock arm are in their working and first predetermined positions, respectively, said thrust element will be positioned on an effective line of thrust in proximity to the point at which a line through said first and second pivot centers intersects a line extending through said third pivot center and through said fixed pivot center of said rock arm.

18. An implement adjusting mechanism for agricultural machines, comprising a rock arm movable about a fixed pivot axis on the machine from a first to a second predetermined position, and vice versa, an adjustable element lockable in different positions of adjustment on the machine, a first link having a first pivot center on said adjustable element, a second link having a second and a third pivot center on said first link and on said rock arm, respectively, at predetermined spacings from said first pivot center and from said pivot axis, so proportioned and arranged that when said rock arm occupies said first predetermined position a line through said first and second pivot centers and a line through said third pivot center and through said pivot axis intersect each other and so that movement of said adjustable element will be substantially ineffective to displace the intersection point of said lines relative to the machine, means operatively connected with said second link including a thrust element operable by movement of said adjustable element and by movement of said rock arm from its first to its second predetermined position to transmit adjusting movement to an implement, and means cooperating with said thrust element to position the latter, when said rock arm is in its first predetermined position, on an effective line of thrust in proximity to said intersection point.

19. In an agricultural machine, a traveling support, an implement unit mounted on said support for up and down movement relative thereto, a lifting arm connected with said implement unit and movable in a generally fore and aft direction for raising and lowering said implement unit, a rock arm movable about a fixed pivot axis on said support in a generally up and down direction between first and second predetermined positions, an adjustable element movable in a generally fore and aft direction on said support and lockable in different positions of adjustment, a first link having a first pivot center on said adjustable element in vertically spaced relation to said pivot axis, a second link having a second and a third pivot center on said first link and on said rock arm, respectively, at predetermined spacings from said first pivot center and from said pivot axis, so proportioned that said first link may be moved in a fore and aft direction and said second link may be swung in a fore and aft direction about said third pivot center by adjustment of said movable element while said rock arm occupies said first predetermined position, and connecting means between one of said links and said lifting arm for transmitting movement of said adjustable element to said lifting arm and for moving said lifting arm to raise said implement unit by movement of said rock arm from said first to said second predetermined position.

20. An implement adjusting mechanism for agricultural machines, comprising a rock arm movable about a fixed pivot axis on the machine from a first to a second predetermined position, and vice versa, a lever pivotally adjustable on the machine to different positions, a first link having a first pivot center on said lever at a predetermined spacing from the pivot axis of said lever, a second link having a second pivot center on said first link at a predetermined spacing from said first pivot center substantially equal to said predetermined spacing of said first pivot center from the pivot axis of said lever, said second link having a third pivot center on said rock arm and being arranged so that, when said rock arm occupies said first predetermined position, a line through said first and second pivot centers and a line through said third pivot center and through the pivot axis of said rock arm intersect each other, irrespective of adjustment of said hand lever, at a point in substantially fixed relation to the machine, and so that when said rock arm occupies said second predetermined position said second pivot center substantially coincides with the pivot axis of said lever, means operatively connected with said second link including a thrust element operable by movement of said lever and by movement of said rock arm from its first to its second predetermined position to transmit adjusting movement to an implement, and means cooperating with said thrust element to position the latter, when said rock arm is in its first predetermined position, on an effective line of thrust in proximity to said intersection point.

WALTER G. CHARLEY.

CERTIFICATE OF CORRECTION.

Patent No. 2,350,588. June 6, 1944.

WALTER G. CHARLEY.

It is hereby certified that error appears in the printed specification of the above numbered patent requiring correction as follows: Page 12, first column, line 50, claim 14, before "lowered" insert --implement--; and that the said Letters Patent should be read with this correction therein that the same may conform to the record of the case in the Patent Office.

Signed and sealed this 8th day of August, A. D. 1944.

(Seal)

Leslie Frazer
Acting Commissioner of Patents.